Aug. 31, 1937. C. M. YODER Re. 20,492

APPARATUS FOR CUTTING METAL

Original Filed March 25, 1931 8 Sheets-Sheet 1

INVENTOR
Carl M. Yoder
BY Geo. B. Tittle
ATTORNEY

Aug. 31, 1937. C. M. YODER Re. 20,492

APPARATUS FOR CUTTING METAL

Original Filed March 25, 1931 8 Sheets-Sheet 2

INVENTOR
BY Carl M. Yoder
Geo. A. Pitts
ATTORNEY

Aug. 31, 1937. C. M. YODER Re. 20,492

APPARATUS FOR CUTTING METAL

Original Filed March 25, 1931 8 Sheets-Sheet 3

INVENTOR
Carl M. Yoder
BY Geo. B. Pitts
ATTORNEY

APPARATUS FOR CUTTING METAL

Original Filed March 25, 1931 8 Sheets-Sheet 4

INVENTOR
Carl M. Yoder
BY Geo. A. Pitts
ATTORNEY

Aug. 31, 1937. C. M. YODER Re. 20,492

APPARATUS FOR CUTTING METAL

Original Filed March 25, 1931 8 Sheets-Sheet 5

INVENTOR
Carl M. Yoder
BY
Geo. A. Pitts
ATTORNEY

Aug. 31, 1937. C. M. YODER Re. 20,492
APPARATUS FOR CUTTING METAL
Original Filed March 25, 1931 8 Sheets-Sheet 6
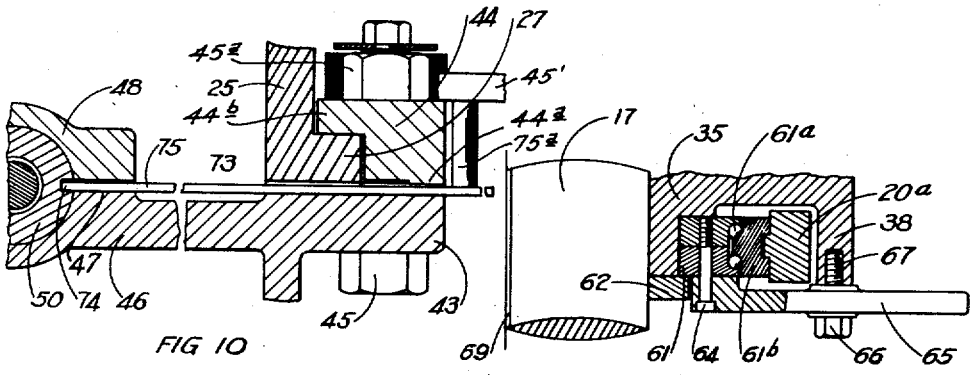
FIG 10
FIG 9
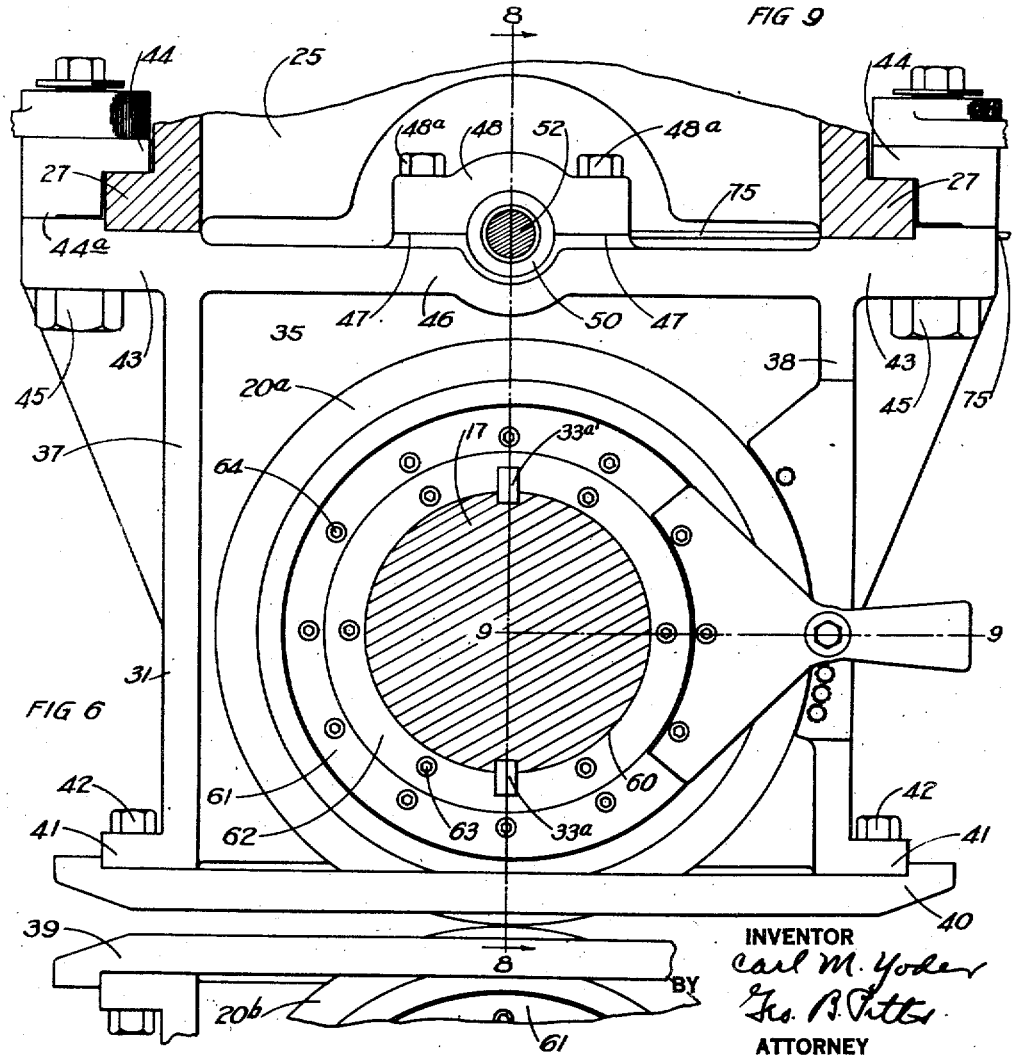
FIG 6
INVENTOR
Carl M. Yoder
BY
Jas. B. Pitts
ATTORNEY

APPARATUS FOR CUTTING METAL

Original Filed March 25, 1931 8 Sheets-Sheet 7

INVENTOR
Carl M. Yoder
BY
Geo. B. Ritter
ATTORNEY

APPARATUS FOR CUTTING METAL

Original Filed March 25, 1931 8 Sheets-Sheet 8

INVENTOR
Carl M. Yoder
BY Geo. B. Tittle
ATTORNEY

Reissued Aug. 31, 1937

Re. 20,492

UNITED STATES PATENT OFFICE 20,492

APPARATUS FOR CUTTING METAL

Carl M. Yoder, Lakewood, Ohio, assignor of one-half to Harvey O. Yoder, Lakewood, Ohio Original No. 1,968,865, dated August 7, 1934, Serial No. 525,067, March 25, 1931. Application for reissue August 6, 1936, Serial No. 94,719

26 Claims. (Cl. 164—61)

This invention relates to apparatus for cutting sheet metal and steel plates, more particularly to an apparatus for trimming one marginal edge or opposite marginal edges of sheets or plates, and/or, when desired, for cutting each sheet or plate into two or more sections. Sheets or plates of the character comprehended above are hereinafter referred to as work. The apparatus herein shown is adapted to operate upon sheets or plates having a maximum width of ninety-six inches and a thickness of three-sixteenths to one-half of an inch, but obviously the invention is not limited to such dimensions.

One object of the invention is to provide an improved apparatus of this character having one or a plurality of sets of shearing or cutting elements, each one of which sets may be moved into a non-operating position, whereby the work may be trimmed to various widths or cut into two or more sections or both trimmed and cut into sections.

Another object of the invention is to provide an improved apparatus of this character having one or a plurality of sets of shearing or cutting elements each one of which sets may be moved transversely of the direction of travel of the work, whereby the work may be readily trimmed to various predetermined widths and also cut into two or more sections of the same or different predetermined widths.

Another object of the invention is to provide a shearing apparatus in which any one or more of the shearing elements may be readily positioned in a non-operating relation.

A further object of the invention is to provide in a shearing apparatus having a plurality of sets of shearing elements, means for adjusting one of the sets of elements or for simultaneously adjusting any two or more thereof, whereby the apparatus may be quickly set for operation.

A further object of the invention is to provide an apparatus of the character herein disclosed that is relatively simple and capable of operation at a relatively high rate of speed.

Other objects of the invention will be apparent to those skilled in the art to which my invention relates from the following description taken in connection with the accompanying drawings, wherein Fig. 1 is a plan view of an apparatus embodying my invention.

Figs. 2 and 2*a*, together, constitute a side view or elevation of the apparatus (with parts broken away).

Fig. 6 is a fragmentary section on the line 6—6 of Fig. 5.

Fig. 9 is a fragmentary section on the line 9—9 of Fig. 6.

Fig. 10 is a fragmentary section on the line 10—10 of Fig. 8.

Figure 1:
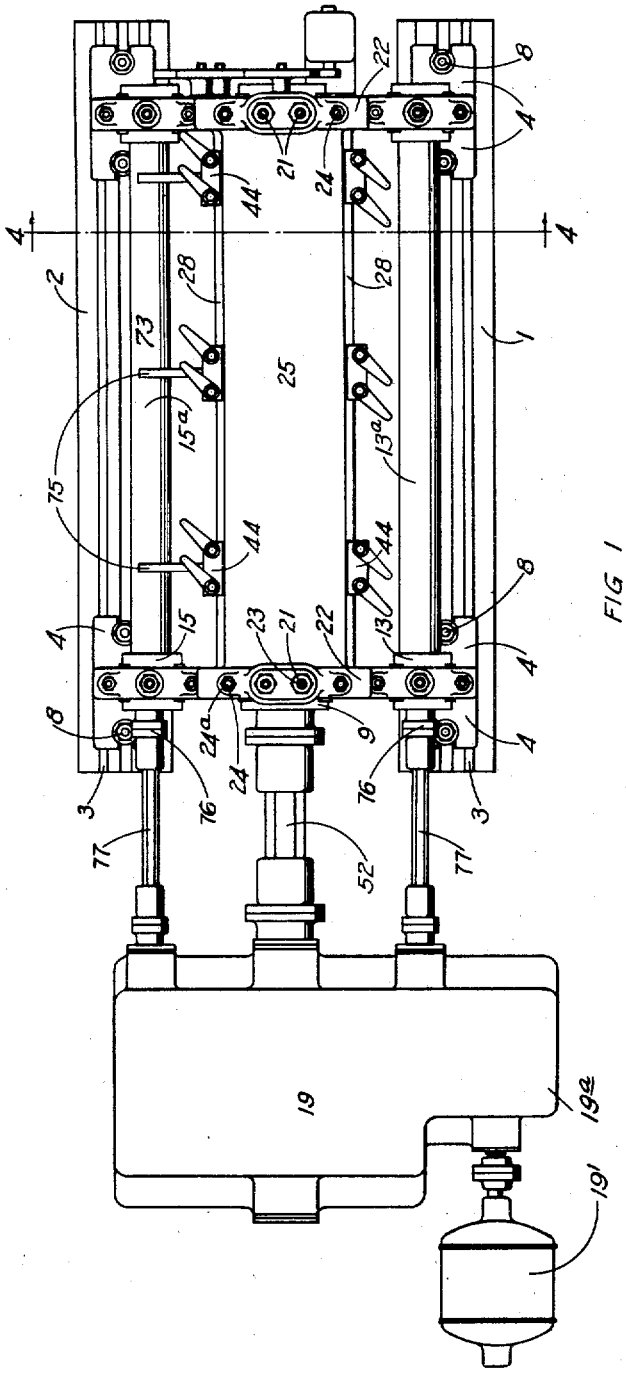

In the drawings, 1, 2, indicate a pair of spaced castings disposed parallel and together forming a support. The castings may be suitably secured to a bed or frame (not shown), or other form of supporting structure. The upper opposite portions of each casting 1, 2, are inclined in opposite directions from end to end thereof, as shown at 3, to form seats for correspondingly arranged walls provided on feet 4. The feet 4 are formed integrally with the lower portions of standards 5, 6. Each casting 1, 2, is formed with a longitudinally extending inverted T-slot 7 and by means of suitable bolts 8 mounted in the slots and extending through openings formed in the adjacent foot portions, the standards 5, 6, are rigidly secured to the castings 1, 2. The standards 5, 6, are disposed in spaced relation and are (*a*) formed with centrally arranged, aligned guides 8′ open at their upper ends for removably and adjustably receiving pairs of upper and lower journal boxes 9, 10, and (*b*) formed in front and rear of the guides 8′ with aligned guides 11, 12, respectively, open at their upper ends, pairs of upper and lower journal boxes 13, 14, being removably mounted in the guides 11 and pairs of upper and lower journal boxes 15, 16, being removably mounted in the guides 12. The purpose of the journal boxes 13, 14, and 15, 16, will be later set forth. The pair of journal boxes 9, 10, support the opposite ends of upper and lower shafts 17, 18, respectively, which are driven in opposite directions by suitable mechanism indicated as an entirety at 19, and have associated with them a plurality of sets of shearing or cutting elements (see Fig. 5), each set being indicated at 20. As will later be set forth the work, indicated at A (Fig. 5), is passed between the shearing or cutting elements 20 to trim the work along its longitudinal side edges to a predetermined width (see selvage portions *a*, *a*, in Fig. 5) and when desired to also shear the work into two or more sections of the same or of different widths. In the accompanying drawings I have shown three sets of shearing or cutting elements, but by spacing the standards 5, 6, farther apart, a greater number of said sets may be provided, it being understood that the invention herein disclosed is not to be limited to any particular number of sets of shearing elements.

The journal boxes 10 rest on the bottoms of the openings at the lower ends of the guides 8'. Each journal box 9 is provided with two upstanding rods 21 which are threaded and adjustably fitted into and extend through threaded openings formed in a cross bar 22, being locked in adjusted position by nuts 23. Each cross bar bridges the guide opening and is secured to the upper ends of the standards 5 or 6, by bolts 24, nuts **24*a*** being tightened on the bolts against the cross bars.

Figure 2:
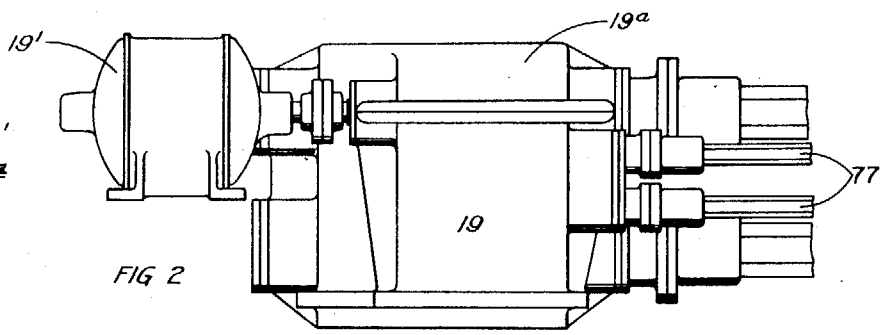
Figure 2A:
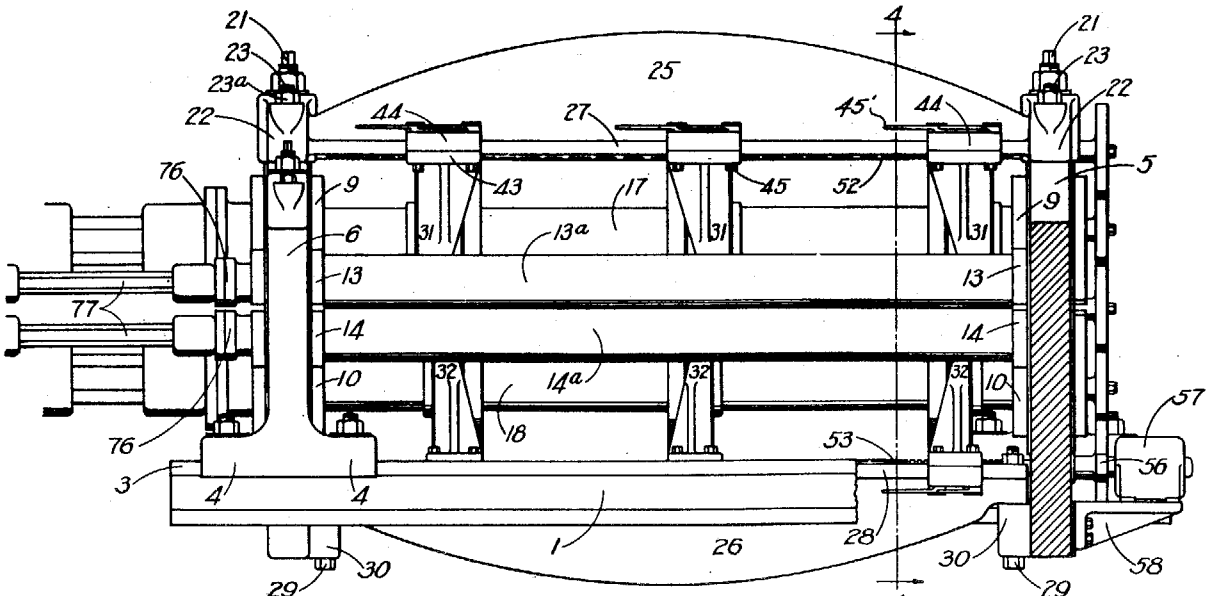
Figure 4:
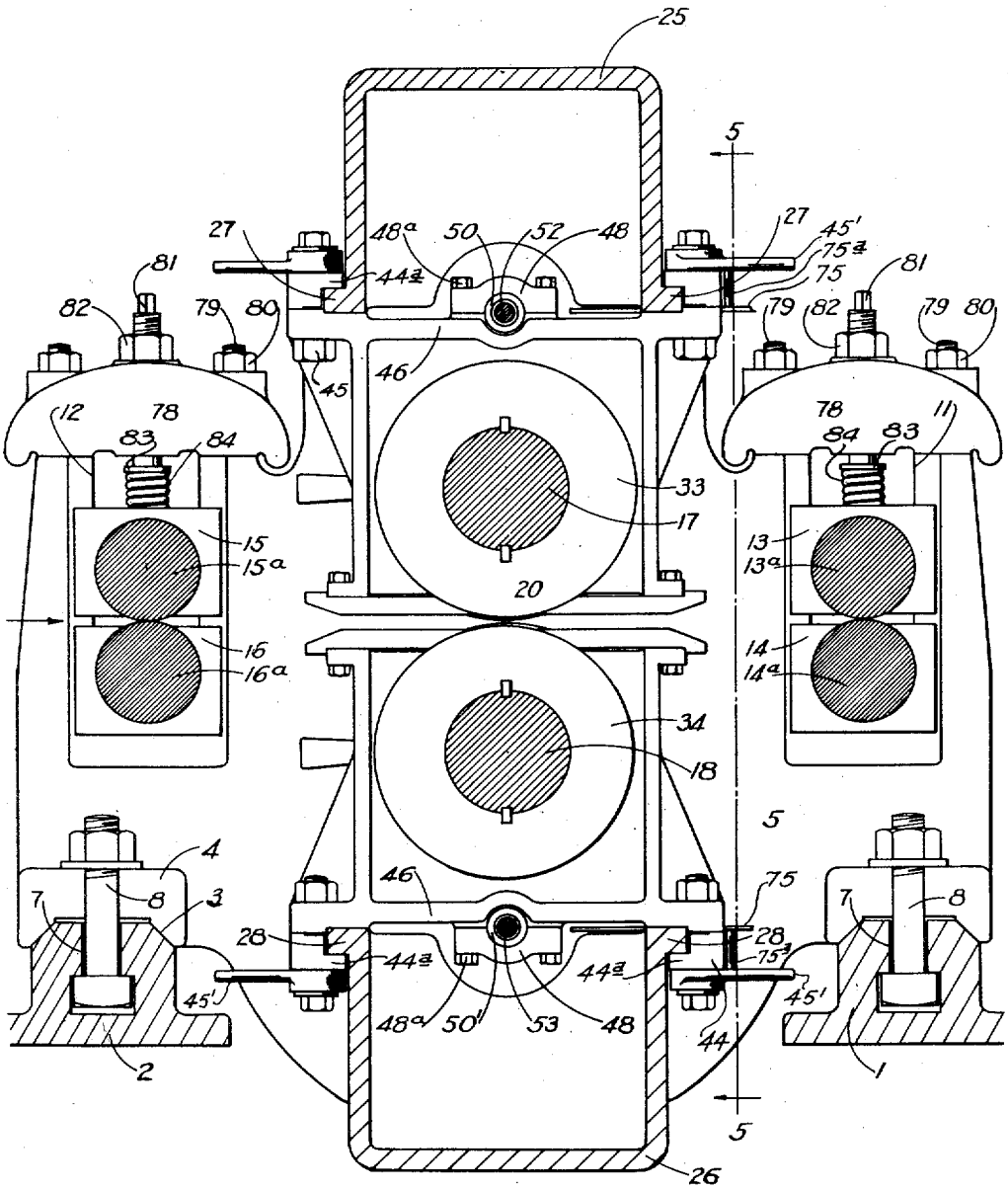
Fig. 4 is a section on the line 4—4 of Figs. 1, 2*a* and 5.

25, 26, indicate upper and lower members which connect the standards 5, 6, and serve to brace them in rigid relation. The opposite longitudinal sides of the members 25, 26, have outwardly extending flanges 27, 28, respectively, which serve as guides to slidably support the respective elements of the sets of shearing elements 20. The upper member 25 is preferably formed integrally with the cross bars 22. The lower member 26 is suitably secured, for example by bolts 29, at its opposite ends to ledges 30 formed integrally on the inner sides of the standards 5, 6. Each member 25, 26, comprises a casting of substantially U-shape in cross section, the bottom of the member being preferably curved as shown in Fig. 2*a*. The lower member 26 is arranged in normal position, whereas the member 25 is inverted (see Fig. 4). As shown, the guides 27, 28, extend along the opposite side walls of the members 25, 26, respectively, from end to end thereof. The guide flanges 27 on the member 25 cooperate with the adjacent shaft 17 to slidably support the mountings (each indicated as an entirety at 31) for the adjacent shearing elements **20*a* of the sets of shearing elements. The flanges 28 on the member 26 cooperate with the adjacent shaft 18 to slidably support the mountings (each indicated as an entirety at 32) for the adjacent shearing elements 20*b* of the sets of shearing elements. The rods 21, through the journal boxes 9, support the shaft 17 relative to the shaft 18, so that the mountings 31, 32**, have a predetermined relation to support (*a*) pairs of upper and lower guiding and feeding rollers 33, 34, in opposed, spaced relation to engage the work A as the latter is fed between them successively and (*b*) the sets of shearing elements 20 in the manner to be later set forth.

Figure 8:
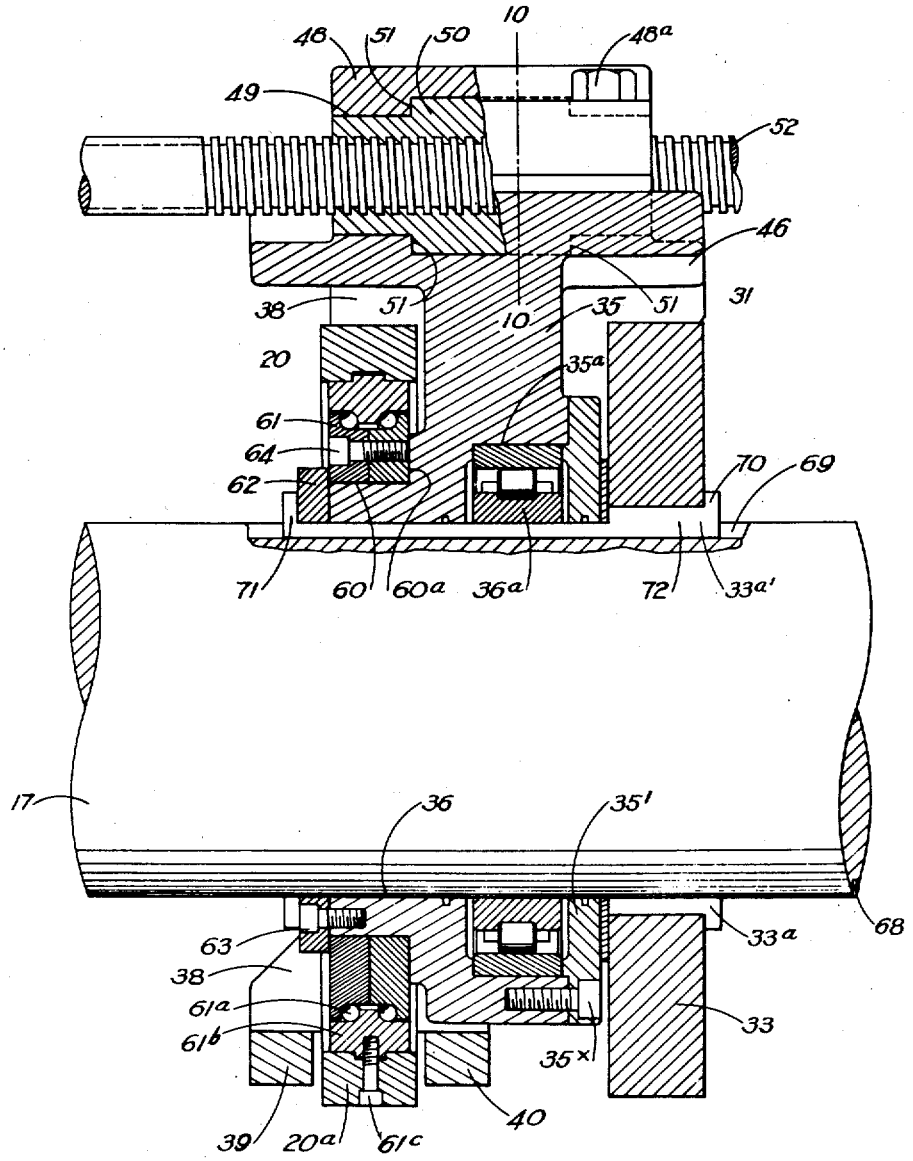
Fig. 8 is a section on the line 8—8 of Figs. 6 and 7.

The mountings 31 and 32 are similar in construction, except that each mounting and the parts carried thereby, on the shaft 17 are reversed with respect to the adjacent mounting and parts carried thereby, on the shaft 18, so that the description of one mounting and the parts carried by it will suffice for each of the other mountings. Referring particularly to Figs. 6 and 8, the mounting 31 comprises a transverse web member 35 formed with an opening 36 to receive the shaft 17. As will be understood the shaft 17 extends through and rotates in the openings of all the webs 35 to drive the roller 33 and the shaft 18 extends through and rotates in the openings 36 of the webs 35 of the mountings 32 to rotate the rollers 34. The rollers 33, 34 being keyed to the shafts 17, 18, respectively, by keys **33*a*, 33*a'* (Fig. 8). To reduce the friction between the shaft 17 and each web 35 the latter is recessed at 35*a* to receive an anti-friction bearing 36*a*, one race (for example, the outer race) of the bearing being held in the recess by a ring 35' which is secured to the web by cap screws 35*x*. The web 35 and inner race of the bearing 36*a* slidably fit the shaft 17, so that they may slide endwise thereof, as will later be set forth. The web member 35 is formed with front and rear walls 37, 38, which extend downwardly and carry at their lower ends guide devices or shoes 39, 40, adapted to support the work A at opposite sides of the adjacent shearing element 20*a*, the lower ends of the walls 37, 38, being flanged at 41 and bolts 42 extending through the flanges to secure the guide shoes thereto. The upper end of the web 35 is provided with outwardly extending flanges 43, which engage the lower faces of the guides 27. 44 indicates stepped plates secured by bolts 45 to the flanges 43 and cooperate with the latter to slidably support the mounting 31 on the guide flanges 27**.

Figure 11:
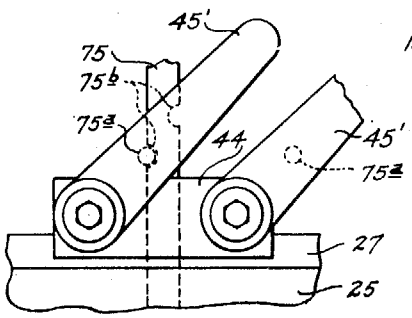
Fig. 11 is a fragmentary plan view.
Figure 3:
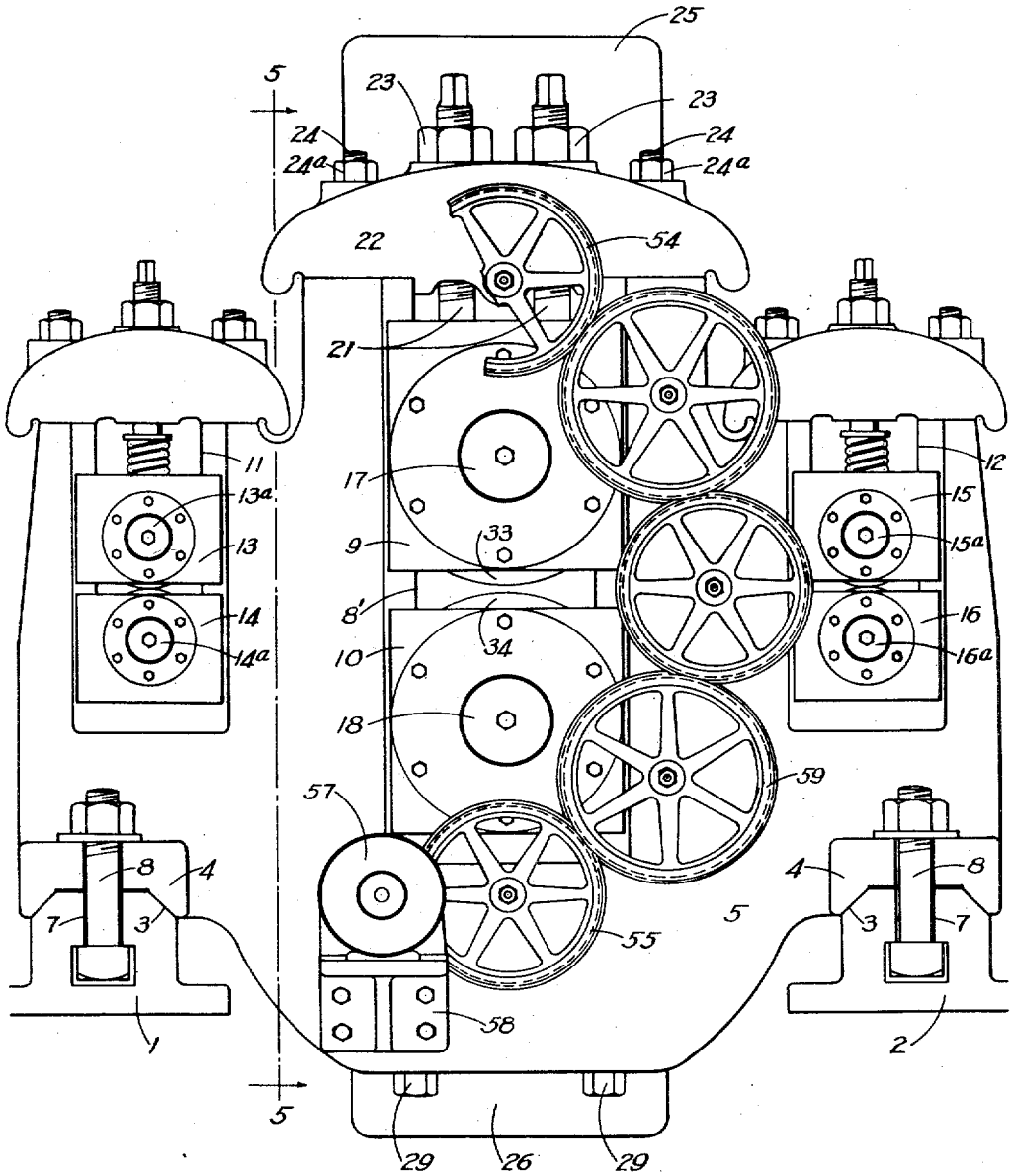
Fig. 3 is an end elevation looking towards the left of Figs. 1 and 2*a*.

It will be noted that the lower face of each of the stepped plates 44 has along its outer edge an off-set or elevated portion **44*a*, about which the plate rocks when the nut 45*a* for the adjacent bolt 45 is tightened, the effect of which is to clamp the flange 43 and stepped portion 44*b* of the plate 44 to the guide flange 27, whereby the mounting is secured against movement in either direction along the guides 27. As shown in the drawings (see particularly Fig. 11), each nut 45*a* is provided with a spanner having a handle 45' (but a suitable tool may be used) to tighten the nut, or loosen it when the mounting is to be moved. Certain of the handles for operating the clamping nuts for each mounting 31 or 32 operate as elements of an interlocking means to be later referred to. The upper end of the web 35 between the walls 37, 38, is flanged in opposite directions, as shown at 46. The flange 46 is provided with seats 47 for a pillow block 48, the latter being secured to the seats by bolts 48*a*. The flange 46 between the seats 47 and the pillow block 48 are shaped to form an opening or bearing 49 for a nut 50. The central portion of the bearing walls is enlarged to form shoulders 51 and the nut 50 is provided with an enlarged intermediate portion, rotatably fitting the enlarged portion of the bearing and having end walls engaging the shoulders 51 to prevent endwise movement of the nut relative to the web 35. The nuts 50 mounted on the mountings 31 are aligned and threaded on a feed screw 52; the nuts 50', which are similarly mounted on the mountings 32, are aligned and threaded on a feed screw 53. From the foregoing description it will be seen that the nuts 50, 50', are rotatable in their bearings 49, but are held against endwise movement therein. It will therefore follow that when the feed screws are rotated, the nuts 50, 50', will rotate with them and be ineffective to impart slide movement to the mountings 31, 32, but by locking the nuts 50, 50', to the walls of their bearings, the rotation of the feed screws will act through the nuts to slide the mountings on their guides 27, 28, respectively, and the shafts 17, 18, respectively. The respective locking means for the nuts 50, 50', will be later described. The screws 52, 53, are suitably mounted in bearings provided in the standards 5, 6; and for the purpose of being driven the shanks of the screws 52, 53, extend through the standard 5 and carry gears 54, 55, respectively. The gear 55 is driven by a pinion 56** (Fig. 2*a*) fixed to the shaft of a motor 57 (such as an electric motor). The motor 57 may be supported on a bracket 58, fixed to the standard 5. The gear 55 preferably operates through a gear train 59 to drive the gear 54. In the arrangement shown for illustrative purposes, the feed screws 52, 53, are rotated in the same direction and at the same speed. The operation of the motor 57 is controlled by a suitable switch means (not shown).

Figure 5:
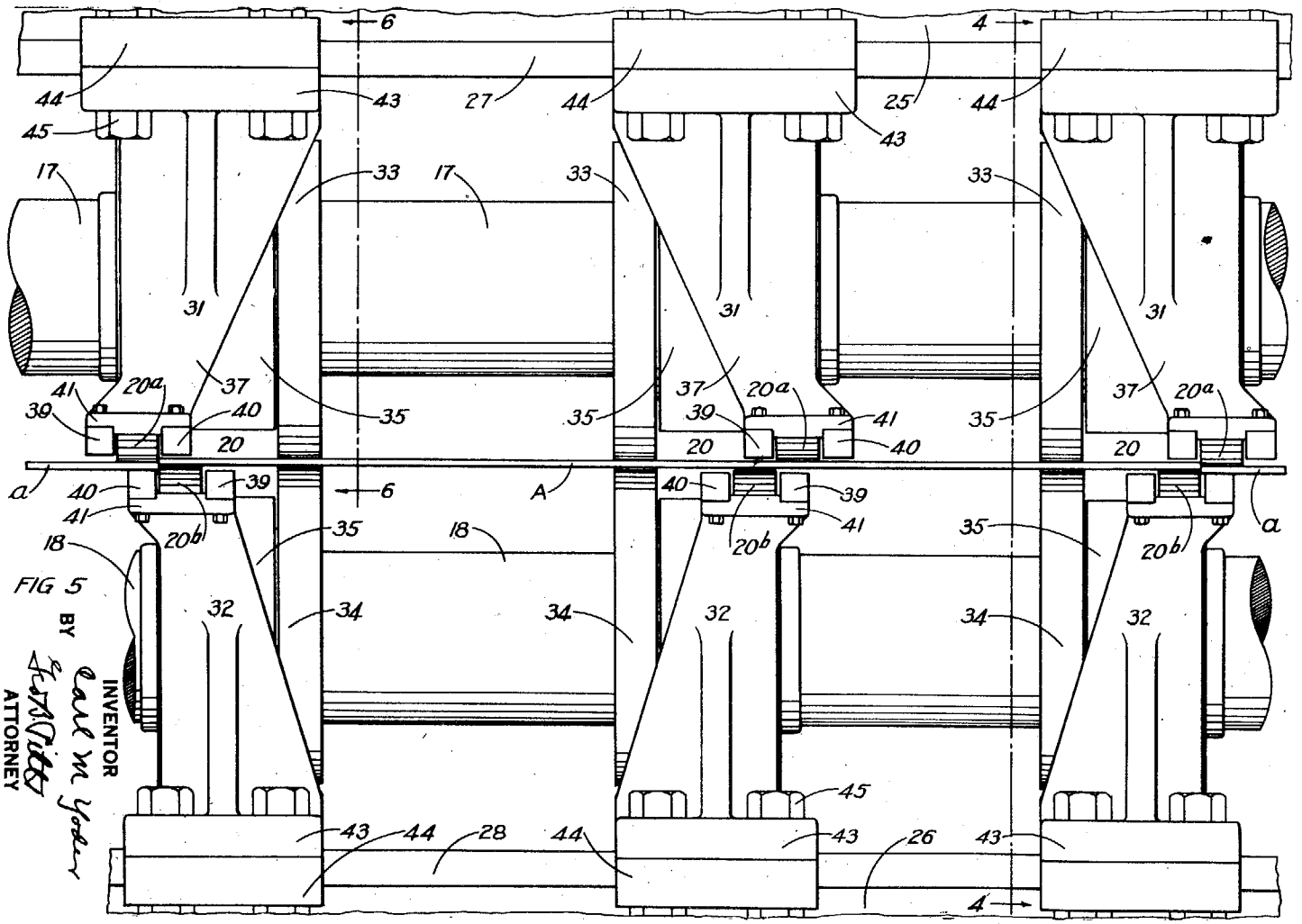
Fig. 5 is a fragmentary elevation on the line 5—5 of Fig. 4 looking in the direction of the arrows.
Figure 7:
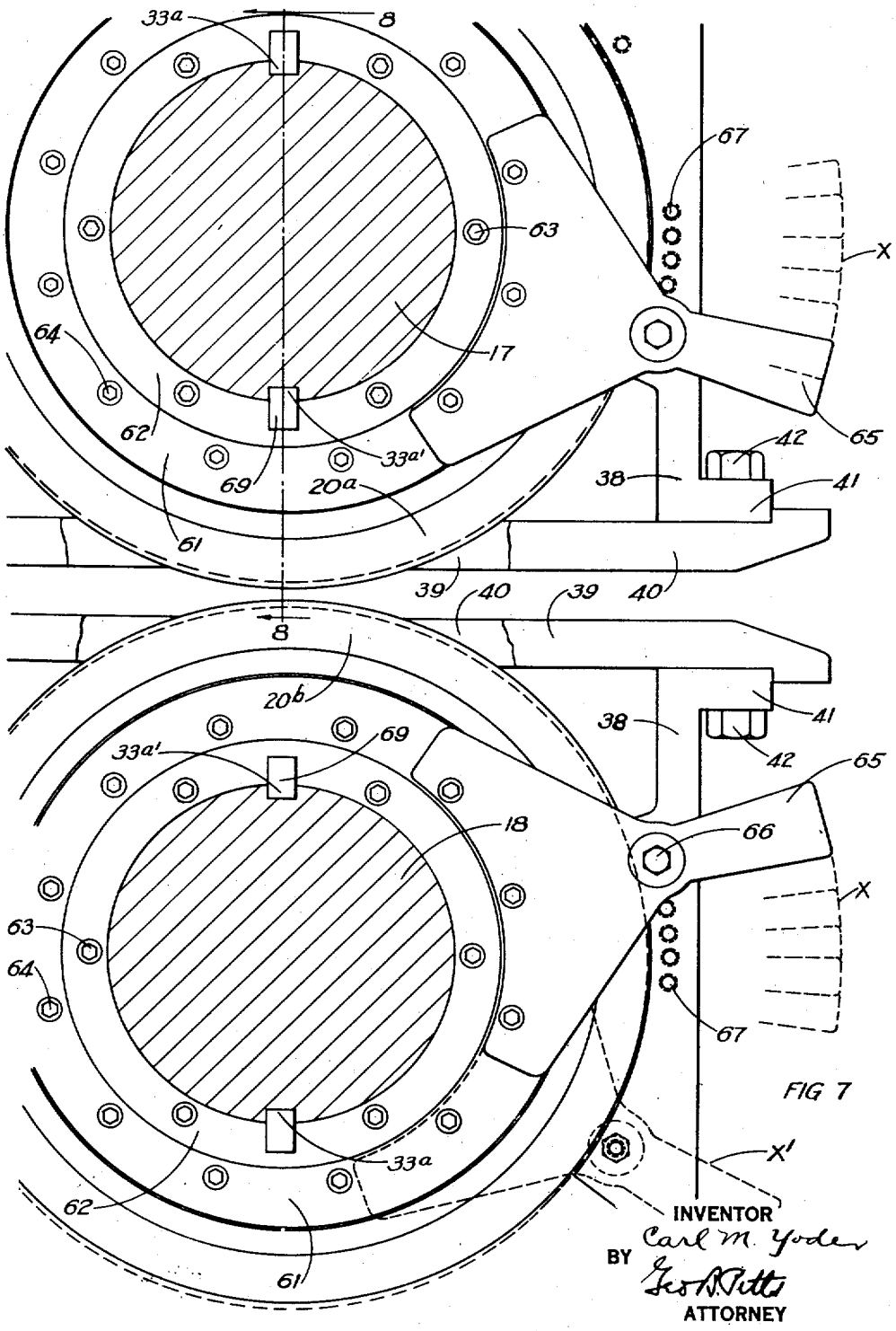
Fig. 7 is a fragmentary section also on the line 6—6 of Fig. 5, parts being broken away.

Each set of shearing elements 20 comprises rotatable annuli **20*a*, 20*b*, having co-acting shearing or cutting edges which cut the work A as shown in Fig. 5. In this view the two end sets of shearing elements are positioned for operation and are shown trimming the work A along its longitudinal marginal portions, and the shearing elements of the intermediate set are moved to their non-operating positions so that the work A is not cut by this set of cutters as it passes through the apparatus. Each of the mountings 31, 32**, is constructed to provide for the movement of the shearing element supported by it from its operating position to a non-operating position, so that any one or more thereof may be (*a*) adjusted to co-act with their respective co-acting elements or (*b*) adjusted to a non-operating position. As a result of such adjustment, either or both marginal portions of the work A may be trimmed, the work A may be cut into two or more sections of equal width or of different widths as the work A is fed through the apparatus. As each shearing element **20*a*, 20*b* is constructed similarly and mounted on one of the webs 35 in the same manner, it will only be necessary to describe one thereof. Referring to Figs. 6, 7 and 8, the web 35 is provided with a wall or neck 60 concentric to the shaft 17 and forming a shaft or bearing for a member 61, the inner wall of which rotatably fits the wall 60. The web 35 is shaped to provide a shoulder 60*a* for the member 61, the latter being held on the bearing 60 and against the shoulder 60*a* by a ring 62, which is secured to the web 35 by cap screws 63. The member 61 preferably comprises two ring shaped elements removably secured together as a unit by a plurality of cap screws 64. The outer or peripheral wall of the member 61 is circular, but such wall is disposed eccentrically to the axis of the shaft 17, so that when the member 61 is rotated or adjusted on its bearing 60, the adjacent shearing element 20*a*, which is mounted on the member 61, is moved into or out of operating position, that is, operating or non-operating relation to its co-acting element 20*b*, according to the direction of rotation or adjustment of the member 61. In Fig. 7, the operating position of the cutting or shearing elements 20*a*, 20*b*, is shown in full lines and their non-operating position is shown in dotted lines. The adjustment of the members 61 may be effected by handles 65 fixed thereto, respectively. Each handle is provided with an opening for a threaded bolt 66, the inner end of which is threaded into one of a series of threaded openings 67 formed in the side of the adjacent wall 38, to thereby lock the member 61 in its adjusted position. The eccentrics 61 for each set of shearing elements are preferably arranged in a predetermined relation so that equal rotative adjustment thereof will move the adjacent shearing elements 20*a*, 20*b*, toward or from each other equal distances; accordingly, when their handles 65 are moved to and secured opposite the two inner openings 67 the shearing elements 20*a* and 20*b*, will operate on work of a certain thickness, or by adjusting the handles 65** equal distances as indicated by the dotted lines *x* (Fig. 7), the elements **20*a*, 20*b*, will be positioned for operation on work of different thicknesses. The openings 67 may be spaced apart predetermined distances to correspond to certain thicknesses of the work and each opening may be designated so that when the handles 65 are adjusted and their bolts 66** are secured in any two corresponding openings the operative will know that the shearing elements are set for operation upon work having the thickness indicated. By adjusting the eccentric to the position *x'* shown in dotted lines in Fig. 7 the shearing elements will be in their non-operating position.

The peripheries of the elements forming each eccentric member 61 are ground or otherwise shaped to provide inner ball races for an anti-friction bearing **61*a* (see Fig. 8). The outer races for the bearing 61*a* are provided on the inner wall of an annulus 61*b* secured to the inner wall of the adjacent shearing element (element 20*a* in Fig. 8) by suitable means including a plurality of cap screws 61*c*. The anti-friction bearings 61*a* permit free rotation of the shearing elements 20*a*, 20*b*, as they engage the work A as it feeds between the guide rollers 33, 34, and guide devices 39, 40**.

Each guide roller 33, 34, is keyed to the adjacent shaft in the manner already set forth, but such keying is so arranged that the roller may slide endwise of the shaft with the adjacent mounting 31 or 32, as a unit.

For this purpose the keys **33*a*, 33*a'* slidably fit key-ways 68, 69, formed in the adjacent shaft and each web 35 and the adjacent guide roller 33 or 34 are connected together, so that when the adjacent mounting 31 or 32 is moved transversely of the apparatus (transverse to the direction of travel of the work A) by the adjacent feed screw, the guide roller will move therewith and thus occupy the same relation to the adjacent shearing element in any transverse adjustment of the mounting. The connection between each web 35 and the adjacent guide roller is shown particularly in Fig. 8, and consists in providing a key 33*a*, which is long enough to extend through the web and roller, having on its opposite ends lugs 70, 71, disposed in engagement with the outer faces of the adjacent guide roller and ring 62, respectively. That portion of the key 33*a* that is coextensive with the thickness of the guide roller 33, shown at 72, projects beyond the outer surface of the shaft and fits into a slot formed in the roller to lock the roller to the shaft, such portion 72 cooperating with the key 33*a* to insure driving of the roller by the shaft. The remaining portion of the key 33*a* between the portion 72 and the lug 71 does not extend above or beyond the keyway side walls and hence permits the free rotation of the shaft within the web 35, ring 62 and ring 35'**.

When it is desired to adjust any one of the sets of shearing elements 20 transversely of the apparatus, the clamping nuts 45 for their mountings 31, 32, are loosened and then the respective nuts 50, 50', associated therewith are connected to the mountings by a suitable detachable connection or means indicated as an entirety at 73.

Thereafter, the feed screws are rotated by the driving mechanism already referred to. When two or more sets are to be adjusted, their mountings are released from the guides and their nuts connected to the mountings by the means 73 and then simultaneously moved as above described. When two or more of the sets of shearing elements are to be moved different distances, then each set is adjusted separately. Since a separate connection 73 is provided between each mounting and the adjacent nut, each mounting or each pair of mountings 31, 32, may be moved in either direction independently of the remaining mountings or any two or more thereof may be operated simultaneously. It will thus be seen that the work may be trimmed to any desired width and when the work is cut into two or more sections, each section may be of any desired width.

Each connection 73, is preferably of the construction shown in Figs. 1, 6, and 10, and consists of a groove 74 formed in the side wall of the adjacent nut, preferably in its enlarged portion, and a locking and releasing device 75 movably mounted with respect to the walls of the bearing 49 and adapted to project into the groove 74, as shown in Fig. 10. The locking device 75 for each nut 50, 50′, preferably comprises a metal strip slidable endwise in suitable guides formed between one of the adjacent seats 47 and pillow block 48, and between the adjacent flange 43 and flange 27 (or 28) and guide plate 44, the outer end of the strip projecting laterally, as shown in Figs. 1, 6 and 10, whereby it may be grasped and operated. When the device 75 is moved outwardly, out of engagement with the adjacent nut, the latter is free to rotate with the feed screw and accordingly the screw, if rotated, is ineffective to move or adjust the adjacent mounting. It will thus be seen that when the feed screws 52, 53, are driven, only those mountings that have their nuts 50, 50′, locked thereto will be moved or adjusted.

I provide an interlocking means between each locking and releasing device 75 and the adjacent handles 45′, the latter being so arranged relative to each other that when they are moved to loosen or unclamp the nuts 45, one handle 45′ interlocks with the device to hold it in attached or locking position (see Fig. 10) and when they are moved to tighten or clamp the nuts the other handle 45′ interlocks with the device to hold it in its detached or released position. For these purposes the handles are provided with depending pins 75*a* and the device 75 is formed with notches 75*b* properly arranged to receive the pins when the handles are operated as above set forth.

The work is fed to and from the sets of shearing elements 20 by pairs of driven rolls 13*a*—14*a*, 15*a*—16*a*, these rolls being mounted in the journal boxes 13, 14, 15, 16, already referred to. The inner ends of the rolls (left hand ends as viewed in Figs. 1, 2*a* and 5) are connected by flexible couplings 76 to shafts 77 which are driven in opposite directions by suitable gearing within a casing 19*a* by a motor 19′. The lower journal boxes 14, 16, are mounted on the bottom wall of the openings for the guides 11 and 12. The upper journal boxes 13, 15 are yieldingly pressed downwardly to hold the rolls 13*a*, 15*a*, in yielding engagement with the rolls 14*a*, 16*a*, whereby these rolls may engage and feed the work to the driven guide rollers 33, 34, and deliver them therefrom. To support the rolls 13*a*, 15*a*, in the manner above set forth I provide cross bars 78 which bridge the openings in the standards 5, 6, and are secured to the upper ends of the latter by bolts 79 and nuts 80. 81 indicates a rod having a threaded portion threaded into an opening formed in each cross bar 78, whereby the rod may be adjusted. The rod is locked in its adjusted position by a nut 82. Near its lower end the rod 81 is provided with a collar 83 and between the collar and the adjacent journal box is a compression spring 84 which normally acts on the box and through it to yieldingly press the adjacent upper roll against the lower roll, the spring being compressed to allow the work to pass between the rolls.

From the foregoing description it will be understood that the roll 13*a*, shaft 17 and roll 15*a* are driven in the same direction and that the roll 14*a*, shaft 18 and roll 16*a* are driven in the opposite direction, the gearing 19 being so constructed, with suitable gear reductions, to effect the rotation of these parts in the directions stated and at the proper speeds so that the surface speed of the rolls 13*a*—14*a*, 15*a*—16*a* and guide rolls 33, 34, which are keyed to the shafts 17, 18, will be the same. Accordingly sheets constituting the work A may be successively delivered to the rolls 13*a*, 142, which in turn will feed them to the guide rolls 33, 34, and between the guide devices 39, 40. As each sheet passes between the guide rolls and guide devices, those shearing elements which have been set for coaction will sever the sheet, as shown in Fig. 5. As the sheet passes beyond the shearing elements, it is engaged by the rolls 15*a*, 16*a*, which effect the discharge of the sheet. The rolls 13*a*, 14*a* are preferably arranged a distance from the guide rolls 33, 34, less than the length of a sheet A, so that the latter will be engaged by the rolls 33, 34, before the sheet passes beyond the rolls 13*a*, 14*a*; likewise, the rolls 15*a*, 16*a*, are positioned a similar distance from the rolls 33, 34, so that the sheet A will be engaged by the rolls 15*a*, 16*a*, before it passes beyond the rolls 33, 34. As the guide devices 39, 40, extend forwardly and rearwardly of the guide rolls 33, 34, the front and rear end portions of each sheet are supported while passing from one pair of rolls to the next pair of rolls.

It will also be understood that each pair of guide devices 39, 40, and the adjacent guide roll 33, 34, are connected to the adjacent mounting in a predetermined relation to the shearing element carried thereby so that when the mounting is adjusted, these parts move therewith, and no separate adjustment or disassembly of these parts is required. The arrangement is also such that the mountings may be moved without any adjustment of the shearing elements, whether the latter are in operating or non-operating positions.

To those skilled in the art to which my invention relates many changes in construction and widely differing embodiments and applications of the invention will suggest themselves without departing from the spirit and scope thereof. My disclosures and the description herein are purely illustrative and are not intended to be in any sense limiting.

What I claim is:

1. In apparatus of the class described, the combination of guide means for a sheet, a plurality of sets of shearing elements, pairs of mountings for the respective elements of said sets, and means engaging any selected pair of mountings for adjusting them in a direction transverse to the direction of travel of the sheets.

2. In apparatus of the class described, the combination of a support, a plurality of pairs of mountings adjustable on said support, guides for a sheet on said mountings, a plurality of sets of shearing elements on said mountings, and means for adjusting simultaneously any selected number of said pairs of mountings.

3. In apparatus of the class described, the combination of guide means for metal sheets, a plurality of sets of co-acting shearing elements, series of mountings for supporting said guide means and said elements, a driven device common to one series of mountings, a driven device common to the other series of mountings, means for operating said driven devices, and a detachable driving connection between each driven device and each of the adjacent mountings, each said connection serving to adjust the adjacent mounting.

4. In apparatus of the class described, the combination of a support, guide means for a sheet, a plurality of sets of shearing elements, pairs of mountings for said guide means and sets of elements adjustable on said support, means for adjusting any selected pair of mountings in a direction transverse to the direction of travel of the sheets, and means for moving each shearing element of each set relative to its mounting and the adjacent guide means into or out of operating position.

5. In apparatus of the class described, the combination of a support, a pair of shafts mounted on said support, pairs of mountings adjustable on said support, rollers carried by the mountings and drivingly connected to said shafts, a plurality of sets of shearing elements carried by said mountings, means for adjusting simultaneously any selected number of said pairs of mountings, and means for moving each shearing element relative to the adjacent mounting out of operative relation to the other element of the set.

6. In apparatus of the class described, the combination of guide means for a sheet, a plurality of sets of shearing elements, pairs of mountings for said sets, means for adjusting simultaneously any selected number of said pairs of mountings transverse to the direction of movement of the sheet, and means for moving the shearing elements of one set relative to their mountings into and out of operating position.

7. In apparatus of the class described, the combination of upper and lower supports, a pair of outer mountings and an intermediate mounting disposed in a plane transverse to the direction of movement of a sheet and slidably supported on said upper support, a pair of outer mountings and an intermediate mounting disposed in a plane transverse to the direction of movement of a sheet and slidably mounted on said lower support, a plurality of sets of shearing elements, one element of each set being mounted on one of said mountings, and guide means carried by said mountings and arranged to engage the sheets fed between the shearing elements of said sets thereof.

8. In apparatus of the class described, the combination of upper and lower supports, a pair of outer mountings and an intermediate mounting disposed in a plane transverse to the direction of movement of a sheet and slidably supported on said upper support, a pair of outer mountings and an intermediate mounting disposed in a plane transverse to the direction of movement of a sheet and slidably mounted on said lower support, a plurality of sets of shearing elements, each element thereof being mounted on one of said mountings, a feed screw common to the mountings on each support, a nut rotatably mounted in each mounting and engaging the adjacent feed screw, means for detachably connecting each nut to the adjacent mounting, means for rotating said screws, and guide means for the sheets fed between the shearing elements of said sets thereof.

9. In apparatus of the class described, the combination of spaced standards, upper and lower shafts mounted therein, upper and lower mountings through which said shafts extend, a set of shearing elements, each said element being rotatably mounted on one of said mountings and surrounding the adjacent shaft, a guide roller surrounding each shaft, said roller being connected to said shaft to be rotated thereby but slidable endwise thereof and connected to said mounting for adjustment therewith, and means for adjusting said mountings.

10. In apparatus of the class described, the combination of a pair of shafts, a set of shearing elements mounted on said shafts mounted to rotate thereon in a plane at right angles to said shafts, means for moving one of said elements, relative to the adjacent shaft, toward and from the other element in said plane, and means drivingly connected to said shafts for supporting work fed between said elements.

11. In apparatus of the class described, the combination of a pair of shafts, a set of shearing elements mounted on said shafts mounted to rotate thereon in a plane at right angles to said shafts, means for moving each of said elements, relative to the adjacent shaft, toward and from the other element in said plane, and means drivingly connected to said shafts for supporting work fed between said elements.

12. In combination, upper and lower shafts, a set of material engaging elements supported to rotate about the axes of said shafts, and an eccentric for adjusting one of said elements relative to the adjacent shaft at right angles to its axis without changing the distance between shaft axes.

13. In apparatus of the class described, the combination of a support, upper and lower driven shafts rotatably mounted thereon, mountings adjustably mounted on said support, a set of shearing elements rotatably supported on said mountings to rotate about the axes of said shafts, means for adjusting each said shearing element relative to the other element in a direction at right angles to the axis of the adjacent shaft, a guide roller connected to each mounting for movement therewith and drivingly connected to and rotated by the adjacent shaft, and means for adjusting each mounting longitudinally of the adjacent shaft.

14. In apparatus of the class described, the combination of upper and lower shafts, alined mountings associated with each shaft and formed with openings through which the shaft extends, each said mounting being provided with a bearing surrounding the adjacent shaft, a shearing element rotatably fitting each said bearing, and a guide on each said mounting in operative relation to the adjacent shearing element.

15. In apparatus of the class described, the combination of upper and lower shafts, mountings, each formed with an opening through which one of said shafts extends, each said mounting being provided with a bearing surrounding the adjacent shaft, a ring rotatably fitting each of said bearings, the outer periphery of said ring being eccentric to said bearing and a shearing element rotatably fitted on the periphery of said ring, and means for adjusting said ring.

16. In apparatus of the class described, the combination of a support, upper and lower shafts, means for rotating said shafts, a pair of mountings slidably engaging said support and each formed with an opening to rotatably receive one of said shafts, a shearing element rotatably mounted on each mounting in operative relation to the shearing element on the other mounting, a feed roll associated with each said mounting, means for keying each said roll to the adjacent shaft and connecting it to the adjacent mounting, and means for adjusting the mountings along said shafts.

17. In apparatus of the class described, the combination of a support having a pair of guides, a mounting slidably engaging each said guide, shearing elements supported in said mountings and co-operable to shear work when fed between them, clamping means for securing each mounting to its guide, power means, a detachable connection between said power means and each mounting for adjusting the latter along its guide, and interlocking means between said clamping means and said detachable connection.

18. In apparatus of the class described, the combination of a support having a pair of guides, a series of mountings slidably engaging each guide, a shearing element on each mounting, each mounting on each guide being related to one mounting on the other guide, to support the shearing elements in co-operable relation, a moving means common to each series of mountings, a detachable connection between each said moving means and each adjacent mounting, and means for holding each said connection in attached or detached position.

19. In apparatus of the class described, the combination of a support having a pair of guides, a series of mountings slidably engaging each guide, a shearing element on each mounting, each mounting on each guide being related to one mounting on the other guide, to support the shearing elements in co-operable relation, a moving means common to each series of mountings, a detachable connection between each said moving means and each adjacent mounting, and means for clamping each mounting to its guide and for holding the adjacent connection in attached position.

20. In combination a stationarily supported member having a central aperture, a relatively stationary support therein, an annular eccentric member angularly adjustable on said member, an annularly apertured material engaging member supported by the eccentric member, and an anti-friction connection between the annular portions of said members.

21. In combination, a pair of shafts arranged in spaced and parallel relation, a material engaging member secured to one shaft, a bearing enclosing and adjustably secured to said other shaft and having a circular face eccentric to the shaft axis, an annular material engaging member concentric with said circular face, and anti-friction means between the member and bearing, said bearing being angularly adjustable relative to its axis and upon the supporting shaft and in a plane at right angles to the axes of the shafts for spacing adjustment.

22. In combination, a pair of shafts arranged in spaced and parallel relation, a material engaging member secured to one shaft, a bearing enclosing and adjustably secured to said other shaft and having a circular face eccentric to the shaft axis, an annular material engaging member concentric with said circular face, anti-friction means between the member and bearing, said bearing being angularly adjustable relative to its axis and upon the supporting shaft and in a plane at right angles to the axes of the shafts for spacing adjustment, and means for driving a shaft.

23. In combination, a pair of shafts arranged in spaced and parallel relation, a material engaging member secured to one shaft, a bearing enclosing and adjustably secured to said other shaft and having a circular face eccentric to the shaft axis, an annular material engaging member concentric with said circular face, said bearing being angularly adjustable relative to its axis and upon the supporting shaft and in a plane at right angles to the axes of the shafts for spacing adjustment.

24. In combination, a pair of shafts arranged in spaced and parallel relation, a material engaging member secured to one shaft, a bearing enclosing and adjustably secured to said other shaft and having a circular face eccentric to the shaft axis, an annular material engaging member concentric with said circular face, said bearing being angularly adjustable relative to its axis and upon the supporting shaft and in a plane at right angles to the axes of the shafts for spacing adjustment, and means for driving a shaft.

25. In combination, a pair of substantially parallel shafts, a set of material engaging members operatively carried thereby and rotatable in a plane at right angles to the shaft axes, means for moving one of said elements relative to the adjacent shaft, toward and from the other element in said plane without changing the distance between shaft axes, and means drivingly connected to one of said shafts.

26. In combination, an upper shaft, a lower shaft, a set of material engaging members supported to rotate about the axes of said shafts, and an eccentric interposed between a member and its associated shaft for adjusting said member relative to the adjacent shaft at right angles to its axis without changing the distance between shaft axes, and means for adjusting said members longitudinally of said shafts.

CARL M. YODER.